US007738883B2

(12) United States Patent
Hull

(10) Patent No.: US 7,738,883 B2
(45) Date of Patent: Jun. 15, 2010

(54) METHOD AND APPARATUS FOR PROVIDING INFORMATION ABOUT A REAL-WORLD SPACE

(75) Inventor: Richard Hull, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1720 days.

(21) Appl. No.: 10/904,000

(22) Filed: Jul. 29, 2004

(65) Prior Publication Data

US 2005/0026631 A1    Feb. 3, 2005

(30) Foreign Application Priority Data

Jul. 31, 2003    (GB) .............................. 0317933.0

(51) Int. Cl.
*H04W 24/00* (2009.01)
(52) U.S. Cl. .............. 455/456.3; 455/456.1; 455/414.2; 701/208; 701/207
(58) Field of Classification Search ............. 455/456.3, 455/456.5, 461, 463, 456.1, 414.2; 701/208, 701/207
See application file for complete search history.

(56) References Cited

U.S. PATENT DOCUMENTS

| | | | |
|---|---|---|---|
| 5,543,797 A | 8/1996 | Hochstein et al. ............. 342/42 |
| 5,963,944 A | 10/1999 | Adams | |
| 6,295,454 B1 | 9/2001 | Havinis et al. .............. 455/456 |
| 6,360,101 B1 | 3/2002 | Irvin .......................... 455/456 |
| 6,539,393 B1 | 3/2003 | Kabala ........................ 707/102 |
| 2002/0062251 A1 | 5/2002 | Anandan et al. .............. 705/14 |
| 2002/0165731 A1 | 11/2002 | Dempsey ....................... 705/1 |
| 2002/0174021 A1 | 11/2002 | Chu et al. ..................... 705/26 |
| 2004/0097226 A1 | 5/2004 | Hull et al. ................ 455/426.1 |
| 2004/0097242 A1 | 5/2004 | Hull et al. ................ 455/456.1 |
| 2004/0137911 A1 | 7/2004 | Hull et al. ................ 455/456.1 |

FOREIGN PATENT DOCUMENTS

| | | |
|---|---|---|
| EP | 0 498 655 A2 | 8/1992 |
| FR | 2 711 001 | 4/1995 |
| FR | 2 793 580 | 11/2000 |
| GB | 2 322 248 | 8/1998 |
| GB | 2 352 587 A | 1/2001 |

(Continued)

OTHER PUBLICATIONS

Bederson, B.B., "Audio Augmented Reality: A Prototype Automated Tour Guide," *ACM Human Computer in Computing Systems conference (CHI '95)*, pp. 210-211, INTERNET: <http://www.cs.umd.edu/~bederson/papers/chi-95-aar/index.html> pp. 1-4 (Feb. 2, 2002).

(Continued)

*Primary Examiner*—Ajit Patel
*Assistant Examiner*—Khai M Nguyen

(57) ABSTRACT

A method and apparatus are disclosed for providing information about a real-world space such as an exhibition space. In a preferred embodiment, users visiting a space are equipped with mobile devices in communication with a service system. The mobile devices are arranged to deposit virtual markers with the service system as the users progress around the space. These markers are stored used to provide trail information concerning use of the space. An operator provided with an interface to the service system can directly modify the stored markers or their significance to thereby modify the trail information.

29 Claims, 8 Drawing Sheets

FOREIGN PATENT DOCUMENTS

| | | |
|---|---|---|
| GB | 2 352 588 A | 1/2001 |
| JP | 4-303213 | 10/1992 |
| JP | 11-096230 | 4/1999 |
| JP | 11-202759 | 7/1999 |
| WO | 99/67904 A1 | 12/1999 |
| WO | 01/35600 A2 | 5/2001 |
| WO | 02/06771 A1 | 1/2002 |

OTHER PUBLICATIONS

Brueckner, S.A., "An Analytic Approach to Pheromone-Based Coordination," *Fourth IEEE International Conference*, Boston, pp. 369-370 (2000).

"Darpa Ito Sponsored Research: Pheromone Robotics," INTERNET <http://Www.darpa.mil/ito/psum2001/H892-0.html> 3 pages total (Feb. 26, 2002).

Dorigo, M., et al., "Ant Colonies for the Traveling Salesman Problem," *BioSystems*, pp. 1-10 (1997).

"Learning's in the Air: Museums, Microcosms, and the Future of the Mobile Net," *Mpulse: A Cooltown Magazine*, INTERNET: <http://www.cooltown.com/mpulse/0901-museums.asp?print=yes> pp. 1-3 (Mar. 13, 2002).

Payton, D., et al., "Pheromone Robotics," *Autonomous Robots*, Kluwer Academic Publishers, Netherlands, pp. 319-324 (2001).

Payton, D., et al., "Pheromone Robotics," *HRL Laboratories*, 32 pages total.

Payton, D., et al., "Progress in Pheromone Robotics," *HRL Laboratories*, 9 pages total (2001).

Russell, R.A., "Assoc. Prof. Andy Russell," INTERNET: <http://www.ecse.monash.edu.au/staff/rar/> pp. 1-5 (Aug. 5, 2002).

Spasojevic, M., et al., "A Study of an Augmented Museum Experience," 6 pages total (2001).

Subing, Z., et al., "A QoS Routing Algorithm Based on Ant Algorithm," *IEEE International Conference on Communications*, Finland, vol. 1, pp. 1581-1585.

METHOD AND APPARATUS FOR PROVIDING INFORMATION ABOUT A REAL-WORLD SPACE

CROSS REFERENCE TO RELATED APPLICATIONS

The subject matter of the present application may also be related to the following U.S. patent application (s): Ser. No. 10/635,939 filed on Aug. 5, 2003; 10/635,938 filed Aug. 5, 2003; and 10/635,940 filed Aug. 5, 2003.

FIELD OF THE INVENTION

The present invention relates to a method and apparatus for providing information about a real-world space by using virtual markers deposited in respect of users of the space.

BACKGROUND OF THE INVENTION

Ant colony optimization is concerned with the development and use of optimization algorithms inspired by the collective behaviour of large colonies of social insects. Typically, the algorithms represent a problem space as a network of nodes connected by arcs. The network is traversed by simple, autonomous agents that are capable both of depositing virtual markers on nodes and arcs, and acting upon the accumulated markers that they encounter on their travels. By an appropriate choice of agent behaviours, some emergent characteristic of the network can be caused to converge on a (near-)optimal solution to the original problem. This approach has been successfully applied to a range of problems such as the 'Traveling Salesman' Problem and job scheduling. More detailed information about the approach can be found in *Swarm Intelligence* by Bonabeau, Dorigo & Teraulaz (Oxford University Press, 1999).

Artificial life seeks to understand the processes by which biological and social complexity arise from simple organisms or agents. Typically, the approach is to construct a computer simulation of a universe populated by such agents and to study their interaction and evolution. The simulated universes may or may not reflect natural laws, and the agents may or may not be modeled on naturally occurring organisms. Within that context, the simulation of ant-like agents with the capability to deposit and sense virtual markers (pheromones) has been known for at least a decade (for example, see *Ant Farm: Towards Simulated Evolution* by Collins & Jefferson (in *Artificial Life II*, Farmer et al, Addison Wesley, 1991).

Agent-based robotics applies similar ideas to motivate the development and exploration of swarms of simple interacting robots operating in the real world. The idea of pheromone deposition and detection is well known in this field but is primarily used metaphorically to inspire mechanisms that actually implement direct communication between individuals rather than indirect communication through the environment in which the individuals move. For example, see *Progress in Pheromone Robotics* by Payton, Estkowski & Howard (preprint, 7*th International Conference on Intelligent Autonomous Systems*, Mar. 25-27, 2002). An exception is the work of Andrew Russell in which robots do deposit (and sense) a chemical marker directly into the environment (see http://www.ecse.monash.edu.au/staff/rar/).

It is an object of a first aspect of the present invention to use the concept of pheromones to provide trail information concerning use of a real-world space such as an exhibition space.

SUMMARY OF THE INVENTION

According to one aspect of the present invention, there is provided a method of providing information about a real-world space, comprising:

(a) as users move through said space, virtual markers are deposited and stored as marker data to indicate associated locations visited by the users in the space; and (b) the stored marker data is used to provide trail information for guiding users in the space;

wherein an operator, using an interface unit and without the need to move around said space, modifies the stored marker data or its significance whereby to modify the trail information derived therefrom.

According to another aspect of the present invention, there is provided apparatus for providing information about a real-world space, comprising:

a marker-data arrangement for receiving virtual markers deposited in respect of users in said space to indicate locations visited by said users, and for storing marker data corresponding to, or based on, the received virtual markers;

a trail-information arrangement for using the stored marker data to provide trail information for guiding users in the space; and an interface unit for enabling an operator, without the need to move around said space, to modify the stored marker data or its significance whereby to modify the trail information derived therefrom.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
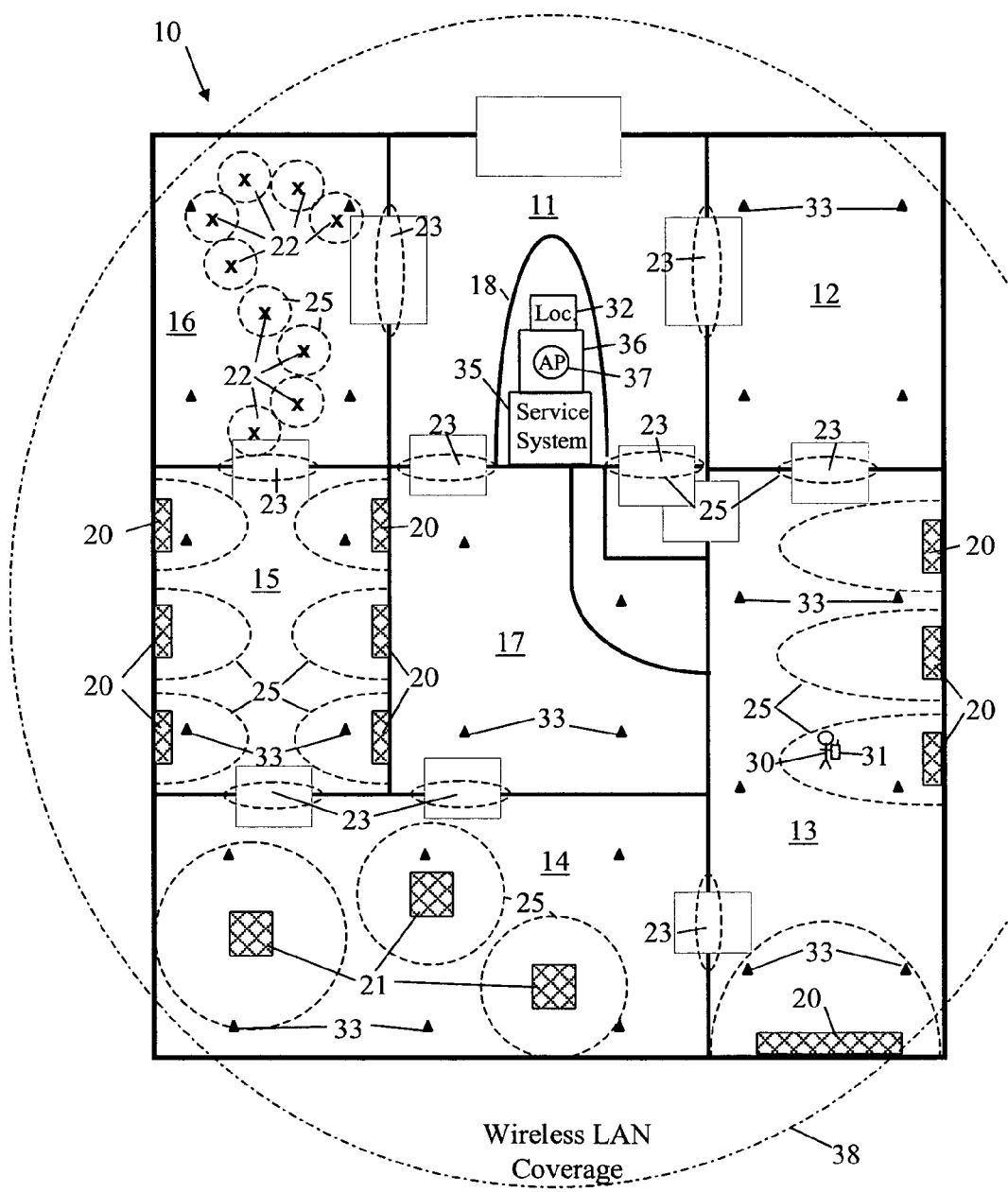
FIG. 1 is a diagram of an exhibition hall having an arrangement for delivering relevant media objects to visitors in a timely manner as the visitors encounter items of interest in the hall.

FIG. 1 depicts a real-world environment for which a number of zones have been defined in a virtual world that maps onto the environment. When a person moving in the environment (called a "user" below) is detected as moving into one of these zones, one or more media objects are delivered to the user via a communications infrastructure and a mobile device carried by the user. A zone may correspond to an area around a real-world object of interest with the media object(s) delivered to a user in this area relating to that real-world object. Alternatively, a zone may not correspond to any real-world object.

In considering such an arrangement, it is convenient, though not essential, to introduce the abstraction of a virtual feature which is the subject of each zone. Each such virtual feature is given a number of properties such as a unique identifier, a location in the real-world environment, the real-world extent of the zone associated with the feature, a subject description indicating what the feature concerns, and a set of one or more media-object identifiers identifying the media objects (or "feature items") associated with the feature. The zone associated with a virtual feature is referred to hereinafter as the 'active zone' of the feature.

For a feature that is intended to correspond to a particular real-world item (and typically having an active zone that maps to an area about a real-world object), this can be indicated in the subject description of the feature. Using the feature abstraction makes it easier to associate feature items that all relate to the same zone and also facilitates adding/removing these features items since data about the real-world extent of the related zone is kept with the feature and not each feature item.

Each feature is represented by a feature record held in a data-handling system, the feature records together defining the aforesaid virtual world that maps to the real-world environment. Each feature can be thought of as existing in this virtual world with some of these virtual features mapping to real-world objects.

As already noted, when a user is detected as within an active zone of a feature, one or more feature items are delivered to the mobile device of the user for presentation to the user. A feature item can be presented automatically to the user upon delivery or the item can be cached and only presented upon the user having expressed an interest in the feature in some way such as by dwelling in the active zone of the feature more than a minimum time or by explicitly requesting presentation of the feature item. Indeed, the delivery of the feature item to the mobile device can also be deferred until the user is detected as having expressed an interest in the feature; however, since this approach can introduce a delay before the item is available for presentation, the embodiments described below deliver feature items to the mobile device of the user without awaiting a specific expression of interest in each feature (though, of course, a general filtering may be applied as to what items are delivered according what types of features are of interest to the user). Preferably, each feature or feature item is given a property indicating whether feature item delivery is to be effected automatically upon delivery or only after a user has expressed an interest in the feature; this enables important items (such as warning messages concerning features associated with potentially hazardous real-world items) to be pushed to the user whilst other items are subject to an expression of interest by the user. Advantageously, a user may elect to have feature items automatically presented even when the corresponding feature/item property does not require this. Furthermore, since as will be described hereinafter, pre-emptive caching of feature items in the user's mobile device may be implemented, automatic presentation is qualified so as only to apply where the user is in the active zone of the feature with which the feature item is associated.

Considering the FIG. 1 example in more detail, the environment depicted is an exhibition hall 10 having rooms 11 to 17 where:

room 11 is an entrance foyer with reception desk 18 but no associated virtual features;

room 12 is a reference library with no associated virtual features;

rooms 13, 14 and 15 are used for displaying real-world objects, namely paintings 20 and sculptures 21, for each of which there is a corresponding virtual feature centred on the object concerned and with an associated active zone 25 (indicated by a dashed line);

room 16 is used for experiencing virtual features for which there are no corresponding real-world objects, the location associated with each feature being indicated by a cross 22 and the corresponding active zone 25 by a dashed line; and room 17 is a cafeteria with no associated virtual features.

Virtual features are also defined in correspondence to the majority of openings 23 between rooms, the active zones 25 associated with the features again been indicated by dashed lines. Typically, the feature items associated with these features are incidental information concerning the room about to be entered and are automatically presented. It will be seen from FIG. 1 that only a single feature is applied to an opening 23 so that it is not possible to tell simply from the fact that a user is detected in the active zone of the feature which room the user is about to enter; however, as will be later described, it is possible to determine from the user's past activity (either location based or feature based) the general direction of progression of the user and therefore which room is about to be entered. This enables the appropriate feature item to be selected for delivery to the user from amongst the items associated with the feature.

On entering the exhibition hall 10, a user 30 collects a mobile device 31 from the reception desk 18 (or the user may have their own device). This device 31 cooperates with location-related infrastructure to permit the location of the user in the hall 10 to be determined. A number of techniques exist for enabling the location of the user to be determined with reasonable accuracy and any such technique can be used; in the present example, the technique used is based on an array of ultrasonic emitters 33 (represented in FIG. 1 by black triangles) positioned at known locations in each room (typically suspended above human level). The emitters 33 are controlled by controller 32 to send out emitter-specific emissions at timing reference points that are indicated to the mobile device 31 by a corresponding radio signal sent by the controller 32. The device 31 is capable of receiving both the timing reference signals and the emissions from the ultrasonic transmitters 33. The device 31 is also pre-programmed with the locations of these emitters and is therefore able to calculate its current location on the basis of the time of receipt of the emissions from the different emitters relative to the timing reference points.

The exhibition hall is equipped with a wireless LAN infrastructure 36 comprising a distribution system and access points 37. The wireless LAN has a coverage encompassing substantially all of the hall 10, the boundary of the coverage being indicated by chain-dashed line 38 in FIG. 1. The wireless LAN enables the mobile device to communicate with a service system 35 to download feature items appropriate to the feature (if any) corresponding to the current location of the user. In the present example, the determination of when the location of the user (as determined by the device in the manner already described) places the user within the active zone of a virtual feature, is effected by the service system; however, it is also possible to have the device 31 carry out this determination provided it is supplied with the appropriate information about the feature zones.

It will be appreciated that communication between the device 31 and service system 35 can be effected by any suitable means and is not limited to being a wireless LAN.

Figure 2:
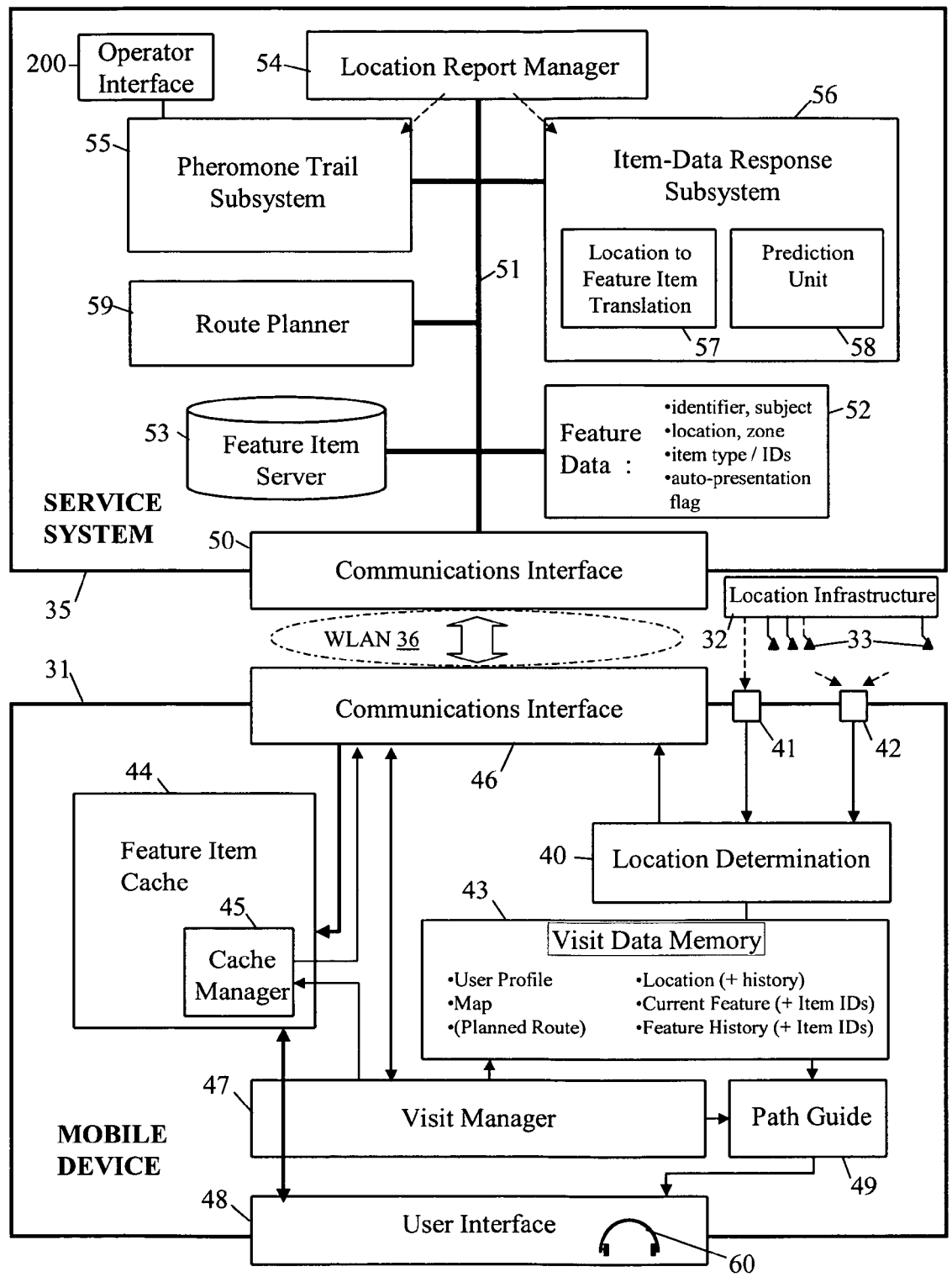
FIG. 2 is a diagram of a mobile device and service system used in the FIG. 1 arrangement.

FIG. 2 shows the mobile device 31 and service system 35 in more detail. More particularly, the mobile device 31 comprises the following functional blocks:

- A location determination subsystem 40 with an associated timing reference receiver 41 and ultrasonic receiver 42 for receiving the timing reference signals from the location infrastructure 32 and the emissions from the ultrasonic emitters 33 respectively; the location determination subsystem 40 is operative to use the outputs of the receivers 41 and 42 to determine the location of the mobile device (as already described above) and to send location reports to the service system 35.
- A visit data memory 43 for holding data about the current "visit"—that is, the current tour of the hall 10 being undertaken by the user of the mobile device 31.
- A feature-item cache 44 for caching feature items delivered to the mobile device 31 from the service system 35. The cache 44 has an associated cache manager 45.
- A communications interface 46 for enabling communication between the mobile device 31 and the service system 35 via the wireless LAN infrastructure 36.
- A user interface 48 which may be visual and/or sound based; in one preferred embodiment the output to the user is via stereo headphones 60.
- A visit manager 47 typically in the form of a software application for providing control and coordination of the other functions of the mobile device 31 in accordance with input from the user and the service system 35.
- A visit path guide 49 for giving the user instructions/indicators for following a planned route around the hall 10.

Much of the foregoing functionality will typically be provided by a program-controlled general purpose processor though other implementations are, of course, possible.

The visit data held by memory 44 will typically include a user/device profile data (for example, indicating the subjects of interest to the user, the intended visit duration, and the media types that can be handled by the device), an electronic map of the hall 10, the user's current location as determined by the subsystem 40, and the identity of the feature (if any) currently being visited together with the IDs of its related feature items. The visit data also includes a feature history for the visit, which is either:

the history of visited features and their related feature item IDs in the order the features were visited (thus, a feature is added to the top of the visited-feature history list when the feature is encountered), or the history of accessed features and their related feature item IDs in the order the features were visited (thus, a feature is added to the top of the accessed-feature history list when one of its feature items is accessed by—that is, presented to—the user whilst the feature is the currently visited feature).

If a visited-feature history list is kept, a history of accessed features can be embedded in it by providing each feature in the history with an associated flag to indicate whether or not the feature was accessed whilst current. Although keeping a visited-feature history provides more information about the visit, it will inevitably use more memory resources than an accessed-feature history and in many cases it will only be desired to track features which the user has found sufficiently of interest to access an associated feature item. Where the purpose of the feature history is simply to keep a list of features (and related feature items) that were of interest to the user, it may be desirable to exclude from the list features for which items were automatically presented but are not associated with exhibits (real or virtual)—that is, exclude features concerned with incidental information about the hall.

The feature history preferably covers the whole of the visit though it may alternatively only cover the most recently visited/accessed features. In either case, the most recent several entries in the history list form what is hereinafter referred to as the "feature tail" of the user and provides useful information about the path being taken by the user.

The visit data held in memory 43 may further include details of a planned route being followed by the user, and a history of the locations visited by the user (this may be a full history or just the locations most recently visited—hereinafter termed the "location tail" of the user).

The service system 35 comprises the following main functional elements:

- A communications interface 50 for communicating with the mobile device 50 via the wireless LAN infrastructure 36.
- An internal LAN 51 (or other interconnect arrangement) for interconnecting the functional elements of the service system.
- A data store 52 for storing feature data and, in particular, a feature record for each feature with each record comprising the feature identifier, the subject of the feature, the corresponding real-world location and extent of the feature's active zone, the IDs and media type of the or each associated feature item, and a flag which when set indicates that feature item presentation of an associated feature item is to be effected automatically upon delivery when the feature is being visited.
- A feature-item server 53 for serving an identified feature item to the mobile device 31 in response to a request from the latter.
- A location report manager 54 for receiving location reports from the location determination subsystem 40 of the mobile device and for passing on data from the reports to functional elements 55 and 56 (see below).
- A pheromone trial subsystem 55 for receiving location data, via manager 54, from all user mobile devices to build up trail data in a manner akin to the use of pheromones by ants.
- An item-data response subsystem 56 for receiving location and other data from the manager 54 in order to prepare and send a response back to the mobile device 31 that provided the location data, about what feature items it needs, or is likely to need, both now, in view of a feature currently being visited, and (where, as in the present embodiment, pre-emptive caching is implemented) in the near future. Subsystem 56 comprises a location-to-feature item translation unit 57 which can either be implemented independently of the data held in store 52 or, preferably, be arranged to operate by querying the store 52, the latter having associated functionality for responding to such queries. Subsystem 56 further comprises a prediction unit 58 for predicting, in any of a variety of ways to be described hereinafter, what feature items are most likely to be needed in the near future.

A route planner 59 for responding to requests from the mobile device 31 for a route to follow to meet certain constraints supplied by the user (such as topics of interest, time available, person or tour to follow, an exhibit or facility to be visited, etc). In providing a planned route, the route planner will typically access data from one or both of the feature data store 52 and the pheromone trail subsystem 55. The route planner 59 can conveniently hold a master map of the hall 10 for use by itself and the other elements of the service system 35, and for download to each mobile device 31 at the start of each new visit and/or whenever the master map is changed.

The functional elements of the service system 35 can be configured as a set of servers all connected to the LAN 51 or be arranged in any other suitable manner as will be apparent to persons skilled.

The mobile device 31 and service system 35 provide a number of useful capabilities that will each be described in detail below after an overview of the general operation of the mobile device and service system during a visit. It is to be understood that the split of functionality between the mobile device 31 and service subsystem 35 can be varied substantially form that indicated for the FIG. 2 embodiment; indeed all functionality can be provided either entirely by the mobile device 31 (with all feature items being stored in the device) or by the service system 35 (with the presentation of feature items to a user being by means of fixed input/output devices located around the hall near the locations associated with the virtual features).

In general terms, a user starting a visit can request a route to follow using the user interface 48 of the mobile device 31 to indicate parameters to be satisfied by the route. This route request is sent by the visit manager to route planner 50 and results in the download to the mobile device 31 of a planned route. The path guide 49 then provides the user (typically, though not necessarily, only when asked) with guide indications to assist the user in following the planned route. Where the interface 48 includes a visual display, this can conveniently be done by displaying a map showing the user's current location and the planned route; in contrast, where only an audio interface is available, this can be done by audio cues to indicate the direction to follow. A user need not request a planned route and in this case will receive no guide indications. A user may request a route plan at any stage of a visit (for example a route to an exhibit of interest).

Figures 3, 4:
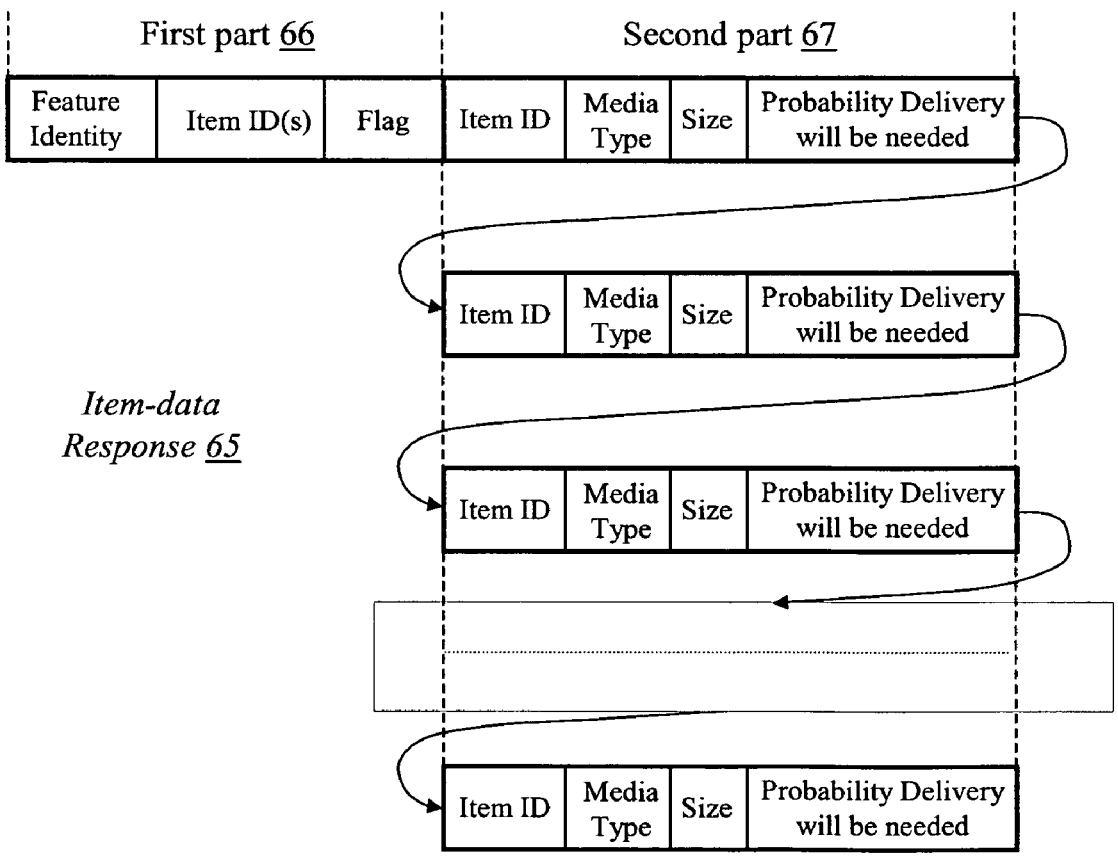
FIG. 3 is a diagram of a location report sent from the mobile device to the service system of FIG. 2.
FIG. 4 is a diagram of a response message sent by the service system to the mobile device of FIG. 2.

As the user moves through the hall, the location determination subsystem 40 sends periodic location reports 62 (see FIG. 3) to the location report manager 54 of the service system 35 via the wireless LAN 36. In addition to the user's current location, these reports typically include a user identifier (and possibly, additionally or alternatively, a type identifier indicative of any variable of interest such as, for example, the group of users to which the device user belongs or an activity being undertaken by the user), user/device profile data, and prediction-assist data for use by the prediction unit 58 in predicting what feature items are likely to be needed shortly. This prediction-assist data can comprise one or more of the following: route data concerning any planned route being followed; the user's "location tail"; and the most recent feature (either the "most-recently visited" or "most-recently accessed") associated with the user, either provided alone or as part of the user's "feature tail".

When a location report 62 is received by the manager 54, it passes on the user's current location in the report to the pheromone trail subsystem 55 to enable the latter to build up trail data from all devices; additionally, the user and/or type identifier may be passed on to subsystem 55 if provided in the location report. The user's current location is also passed to the item-data response subsystem 56 together with any profile data and prediction-assist data in the location report 62. The item-data response subsystem 56 then constructs and sends a response 65 (see FIG. 4) to the mobile device 31 that originated the location report.

More particularly, the location-item to feature translation unit 57 of subsystem 56 uses the data passed to subsystem to determine the feature, if any, currently being visited by the user and thus what feature items are relevant to the user in their current location. In doing this, the unit 57 may also use the supplied profile data to disregard both features that do not relate to a subject of interest to the user and feature items of a media type that cannot be handled by the mobile device 31. The unit 57 may also use elements of the prediction-assist data (for example, the location or feature last encountered before the current one) to enable it to determine the direction of progression of the user and thus to select between feature items of a feature in dependence on the direction of approach of the user. This is done, for example, for the features associated with openings 25 in order to select a feature item appropriate to entering a room. The IDs of feature items identified by the unit 57 together with the identity of the corresponding feature and the status of the automatic presentation flag of the feature, form a first part 66 of the response 65 to be sent back to the mobile device 31. Where the current location does not correspond to the active zone of any feature, the first response part 66 simply indicates this.

A second part 67 of the item-data response 65 is produced by the prediction unit 58 and comprises a list of the feature items most likely to be needed in the near future by the mobile device 31; for each such feature item, the second response part 67 includes the feature ID, its type, size and probability of usage. Like the unit 57, the unit 58 uses supplied profile data to disregard feature items of features not of interest to the user or of a media type that cannot not be handled by the mobile device 31. The number of feature items identified in response part 67 is preferably limited (for example, to ten such items). The item-data response subsystem 56 then sends the response 65 back to the mobile device 31 of the user by using a return address supplied with the original location report 62 and passed to subsystem 56 by the manager 54.

Rather than having the prediction unit 58 provide a prediction each and every time the mobile device 31 sends a location report, it is possible to arrange for the prediction unit 58 only to operate when required by the mobile device 31 with the latter only requiring a prediction, for example, every nth location report or only after the user has moved a certain distance since the last prediction made by unit 58. Conveniently, the location report field used to carry the prediction-assist data is also used to indicate when a prediction is required by, for example, setting the field to a predetermined value when prediction is not required.

The item-data response received back at the mobile device 31 is processed by the visit manager 47. If the first part 66 of the response identifies a feature (thereby indicating that the current location of the user corresponds to the active zone of feature), the manager 47 updates the 'current feature' data in memory 45 to the feature identifier and item IDs in the first response part. These item IDs are also passed to the cache manager 45 and are used by the latter to request immediate delivery of these items from the server 53 of the service system to cache 44, if not already present in the cache. If the feature history data held by memory 43 relates to visited, rather than accessed, features, and if the feature identifier and item IDs in the first response part 66 differ from the most recent entry in the feature history list, the latter is updated with the feature identifier and item IDs from the first response part 66.

In the case that no feature is identified in the first part of the response 65, the 'current feature' data in memory 43 is set to null.

The manager 47 also determines whether the (first) feature item (if any) identified in the first response part 66 is to be immediately presented to the user, this determination taking account of the setting of the automatic presentation flag in the first part of the response, any user indication (stored, for example in the profile data) that all items are to be automatically presented, and any monitored indications of the user's interest in the currently-visited feature. Where a feature item identified in the first response part is to be immediately presented to the user, the manager 47 requests the item from the cache manager 45 (there may be a delay in the delivery of the item if it has not yet been received from the server 53). At the same time, if the feature history concerns accessed features the manager 47 updates the feature history with an entry corresponding to the feature identifier and item IDs forming the 'current feature' data; where the feature history although recording all visited features, provides for indicating whether a feature has been accessed, the manager updates the feature history accordingly.

With respect to the data contained in the second part 67 of the response 65, the visit manager simply passes this data to the cache manager 45 which determines whether or not to request from server 53 any of the items identified that are not already in the cache 44. The cache manger 47 in making this determination takes account of the probability that an item will be needed in the near future and the available cache space. The cache manager 45 may decide to create additional cache space by flushing one or more items from the cache.

In this manner, the cache manager 45 seeks to ensure that the next item requested by the visit manager 47 as the user progresses to the next feature will already be in the cache 44.

Following the processing of an item-data response by the visit manager, whenever a feature item is accessed (presented) either as a result of the visit manager 47 determining that the current feature is of interest to the user or as result of the user specifically requesting the item (for example, after inspecting the list of items associated with the current feature), then where the feature history data records accessed feature information, the visit manager 47 checks if the feature associated with the accessed item is the current feature and, if so, updates the feature history to record the feature as an accessed one if not already so indicated.

The visit manager can also be arranged to keep a list in memory 43 of the individual feature items accessed.

Having described the general operation of the mobile device 31 and service system 35, a more detailed description will now be given of some of the functionality embodied in the arrangement of FIGS. 1 and 2.

Pheromone Trails

The location reports provided by the mobile device 31 and passed to the pheromone trail subsystem 55 serve as virtual markers in the virtual world corresponding to the hall environment. These markers are stored by the subsystem 55 and used to build up trail and other useful information about utilisation of the corresponding real-world environment.

In general terms (that is, without limitation to the specifics of the embodiment of FIGS. 1 and 2), the virtual markers left in whatever manner in respect of a user can be given a variety of characteristics. For example, the markers can be arranged to reflect the nature of pheromones laid by social insects such as ants and have the following characteristics:

the markers are left automatically;
markers from different users are undifferentiated;
markers have a value that diminishes both with time and with the distance from the point of marking;
markers accumulate, that is the value of overlapping markers at a point is the sum of their values at that point;
markers can be detected by all other users of mobile devices in the environment.

However, each of these characteristics represents a choice in some dimension and other choices are possible. For example:

each marker may be left following a specific user action to do so in respect of that marker (that is, left deliberately);
markers may be identified by their source;
markers may be of different types to reflect different activities or intentions by the source;
markers may be persistent;
markers may be stored as distinct elements;
perception of the markers may be limited to particular users.

Of course, a wide range of mixes of the above choices of characteristics (and of other characteristics) are possible and although the term "pheromone trail" is used herein to refer to the general arrangement of the deposition and use of virtual markers, this term should not be taken as implying that any particular characteristic is being implemented in respect of the arrangement concerned or that the use of the markers is related to delimiting a trail. Furthermore, it is to be understood that implementation of any particular characteristic is not tied to either one of the mobile device 31 or service system 35. Indeed, the service system is not essential for the implementation of a pheromone trail arrangement where the devices can communicate amongst themselves. Conversely, whilst some form of mobile device will generally need to be carried by the user to assist in determining the location of a user, the actual location determination of a user and corresponding marker deposition can be done by the service system 35; for example, the user's mobile device can be arranged to emit distinctive ultrasonic signals at intervals which are picked up by fixed receivers with time of receipt information then being used to determine the user's location and a corresponding virtual marker deposited in respect of the user. A system that does not require any device to be carried by the user for the purposes of location determination is also possible such as a camera-based system that can track the movement of an individual user through the hall 10 with the images produced by different cameras being correlated to follow the user as he/she passes from the field of view of one camera to that of another (this correlation can be aided by the use of face recognition technology). An alternative approach is to use pressure sensors to detect the footfalls of users with the individual footfalls being correlated to determine the most likely pattern of related footfalls corresponding to movement of single users (this correlation is facilitated if the pressure sensors also give a weight reading for each footfall).

Whatever the detailed characteristics of the markers, the effect of their deposition as users move around the physical environment is the generation of a marker "landscape" in the digital representation of that environment. The ridges, peaks, troughs and wells of this landscape reflect the number of markers laid in each part of the landscape and will typically (though not necessarily in all cases) also reflect the time elapsed since the markers were laid. The devices of other users are arranged to be able to sense this landscape enabling them to use various gradient and contour following applications to traverse it, for example to follow (or avoid) popular paths. In doing so, the intensity of marker accumulations can be indicated to users in a variety of ways; for example intensity levels can be represented through an audio signal whose loudness or frequency varied with that intensity or through a visual display.

Figure 5:
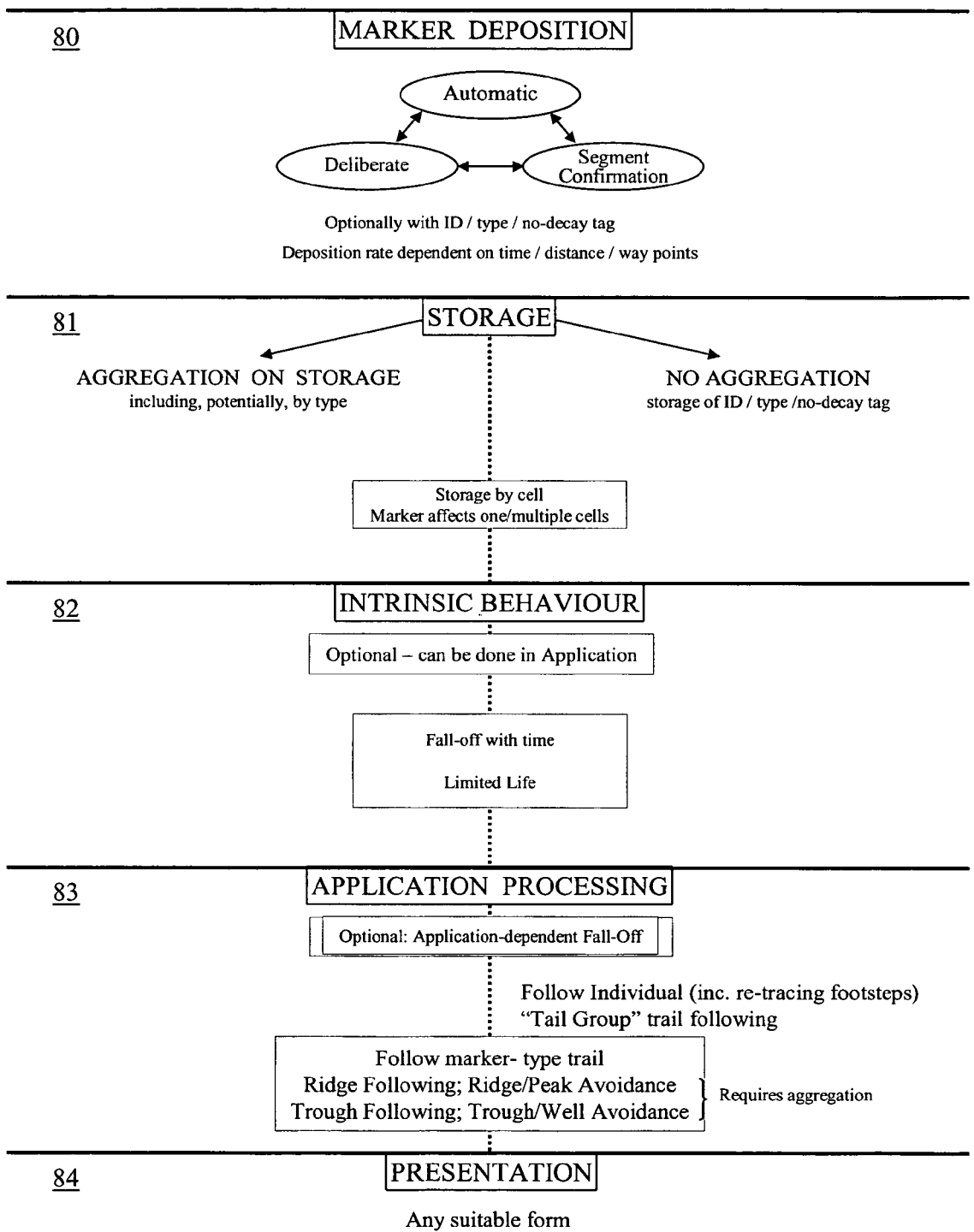
FIG. 5 is a diagram illustrating some of the choices available when implementing a pheromone trail mechanism such as provided by the mobile device and service system of FIG. 2.
Figure 6:
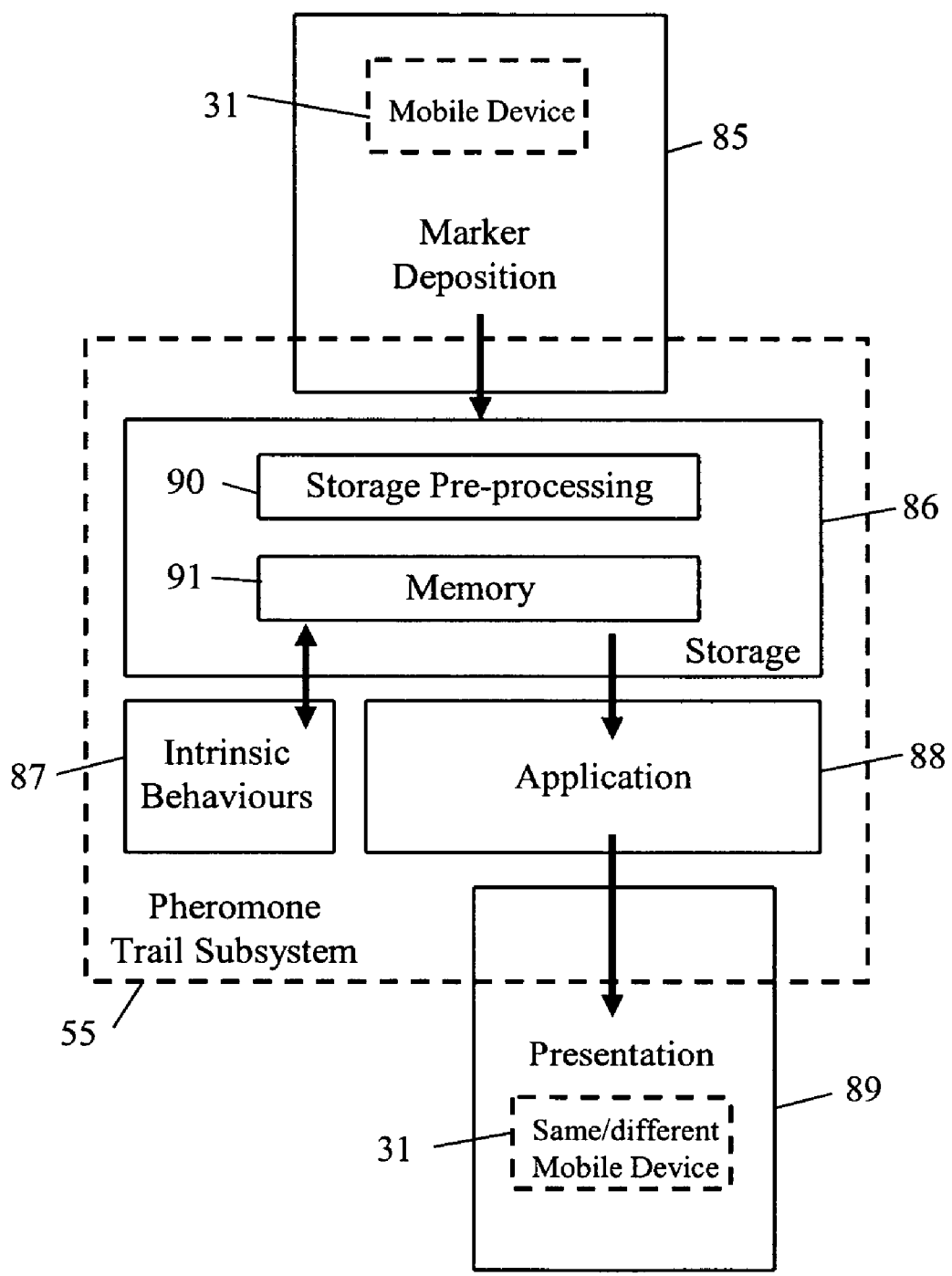
FIG. 6 is a diagram depicting the functional blocks involved in providing a pheromone trail mechanism.

FIG. 5 depicts some of the implementation choices available when constructing an embodiment of the pheromone trail arrangement, these choices being arranged by processing stage according to a division of the pheromone trail process into five such stages (other divisions being possible). The five stages depicted in FIG. 5 are marker deposition 80, storage 81, intrinsic behaviour 82 (applied to the stored data), application processing 83, and presentation. 84. These stages are carried out by corresponding functional blocks 85 to 89 depicted in FIG. 6 with the storage block 86 having two sub blocks, namely a storage pre-processing block 90 and a memory block 91. Also shown, in dashed lines, in FIG. 6 are the mobile device 31 and pheromone trail subsystem 55 of the FIG. 2 embodiment positioned to indicate where the functional blocks 85 to 89 are disposed in that embodiment. It will be appreciated that the pheromone trail subsystem 55 will generally be implemented as a program-controlled processing system.

Considering first the marker deposition stage 80 (functional block 85), marker deposition can be done automatically, by deliberate user-action per marker, or by deliberate user confirmation of an automatically-generated series of latent markers representing a trail segment. Where markers are deposited (or generated) automatically, the frequency of deposition/generation can be made time or distance dependent (with respect to the last marker) or can be arranged to occur at specific way points around the environment, for example, at virtual features (that is, when a user enters the active zone of the feature, with typically only one marker being deposited/generated per feature encounter). Depositing a marker when a feature is encountered does, of course, require the mapping between location and features to have first been carried out; this can be done either by arranging for this mapping to be effected in the user's mobile device or by arranging for the unit carrying out the mapping away from the device (for example, unit 57 in the FIG. 2 embodiment) to deposit a marker on behalf of the device.

However a marker is deposited/generated, each marker may have an associated user identifier and/or type indicator (indicating some special significance not specific to a user). In the case of there being more than one type of marker, either a single marker type can be associated with a user or multiple types of marker can be associated with the user. Where multiple marker types are associated with a user, different conditions can be specified for when each type of marker is to be deposited (for example, one type of marker could be deposited at regular intervals whilst another type only deposited when at a virtual feature). More than one type of marker can be deposited at the same time where appropriate and in this case it can be useful to avoid duplication of data by combining the different types of basic marker into a single compound marker with attributes defining the types of basic marker represented by the compound marker.

Each marker may also have a tag to indicate a desired decay behaviour—for example, where, by default, a marker is arranged to decay, a no-decay tag can be included which if set (or "true") indicates that the marker concerned is not to be given the default behaviour of decaying in value with time. Of course, it is possible to view the decay tag simply as a marker type indicator with markers tagged for decay being decay-type markers and markers tagged not to decay being no-decay type markers.

The main choice presented at the storage stage 81 (functional block 86) is whether a marker is to be aggregated with previously stored markers deposited at the same location or stored as an individual marker along with any associated data. Whilst aggregation produces useful information, storing in an un-aggregated form has the advantage of preserving the maximum amount of raw data whilst leaving open the option to later on retrieve a copy of the data for aggregation; the disadvantages of not aggregating initially are the much greater storage capacity required and the delay in later on obtaining aggregated data. Where aggregation is effected, this can be done across all types of marker or for each type of marker separately. Typically aggregation is done by adding an initial strength value to the aggregated strength value already stored for the same "location cell" as that in which the marker was deposited where a location cell corresponds to a specific area of the real-world environment. Rather than a marker being allocated to one location cell only, the strength of the marker can be divided up between the nearest cells in proportion, for example, to the distance between the point of deposition of the marker and a center point of each of the nearest cells. The initial strength value of a marker can be made dependent on the type of marker concerned where multiple marker types are present.

The intrinsic behaviour stage 82 (functional block 87) applies behaviours to the aggregated or non-aggregated markers. For example, the aggregated or non-aggregated marker strength can be reduced with time with the rate of strength decay being dependent on marker type (the decay rate can be of any suitable form such as by a fixed amount per unit time or a by fixed proportion of the remaining strength per unit time). Where a marker is individually stored, the marker can also be given a limited life determined as expired either when its strength falls below a certain level or when the marker reaches a certain age (for which purpose, a time-of-deposition time stamp can be stored along with the marker). Applying intrinsic behaviour is done, for example, by a process that regularly scans the memory block 91, reviewing and modifying its contents as necessary. The intrinsic behaviour stage 82 may not be present either because no relevant behaviours are being implemented or because they are applied as part of the applications processes for using the stored data.

The application stage 83 (functional block 88) uses the stored data to carry out specific application tasks and may also apply behaviours, such as marker strength fall off with time, to the data copied from storage where such behaviours have not been applied earlier to the stored data itself. Typical application tasks include:

where markers of one or more types are aggregated (either on storage or by the application), determining and following a "ridge" of the highest-strength marker aggregations corresponding to the most popular trail through the environment; a related application is one where a "trough" of the weakest (or zero) marker aggregations is followed;

where markers are stored individually with user IDs and a strength fall-off with time behaviour has been applied to the stored data, following a trail left by a specific user, the strength of the relevant markers indicating the direction of movement along the trail;

where markers are stored individually with user IDs and deposition timestamps enabling the trail laid down by each user to be followed, predicting or proposing a user's future movement on the basis of the movement forward from that user's current location of previous users whose trail leading to this location matches closely with the location tail of the subject user (that is, with the locations of the last several markers deposited by the current user);

where markers are deposited on encountering a virtual feature and the markers are aggregated by type with a decay that is exponential in form with a time constant of half a day for example, determining the most popular features of a given type for the current day by determining the strongest aggregation of markers of that given type.

It should be noted that different applications may call for different marker strength decay rates. This can be accommodated in a several ways—for example, each marker that is deposited can be split into multiple copies with each copy being used for a particular application and decayed (either as an intrinsic behaviour or by the application) at an appropriate rate. A variant of this approach is to give a single marker multiple strength attribute values, each value being associated with a different application and being decayed at a rate appropriate for the application concerned either as an intrinsic behaviour or by the application; this is equivalent to there being a respective marker type per application with markers of several different types being deposited at the same time in a compound marker (of course, it would also be possible to actually deposit discrete markers per application type).

As regards the presentation stage 84 (functional block 89), how the output of an application is presented to a user will depend on the nature of that output and the interface modalities available. Typically, where an application task has determined a trail to follow or the most popular features, this can be presented to the user on a map display whilst if an application is arranged to provide real time guidance along a path, this may be best done using audio prompts.

Implementation details of the functional blocks 85-89 for any particular combination of the available choices discussed above will be apparent to persons skilled in the art. It should be noted that multiple combinations of choices can exist together; for example, markers can be arranged to be deposited by a mobile device both at fixed time intervals and every time a feature is encountered and a marker can be both aggregated upon storage as well as an individual copy being kept. Thus in one implementation, an array data structure is used to define an X-Y array of location cells with each cell mapping to a respective area of the real world environment (hall 10) and being used to hold, for each marker type, both an aggregated strength value for the markers of that type deposited at locations covered by the real-world area to which the cell maps, and a pointer to a linked list of individual records for those markers which are still alive (that is, not time expired). With respect to the embodiment of FIGS. 1 and 2, the pheromone trail subsystem 55 is arranged to store markers of three different types, namely:

"tour" markers deposited in the form of location reports 62 by a tour guide and serving to delineate a proposed route around the hall. These markers are each deposited by deliberate act of the tour guide and have an associated "no-decay" tag as well as an indicator of their type. Preferably the type indicator has an associated sub-type that identifies a specific tour. Since each specific tour will have only one set of markers associated with it, storing the tour markers on the basis of aggregating markers of the same type and sub-type deposited in the same location is the same as storing the markers individually and either approach may be adopted The stored markers are not decayed with time.

"normal" markers deposited in the form of location reports 62 by the mobile devices 31 of visitors, these markers being deposited at fixed time intervals and being subject to aggregation on storage with other markers of this type deposited in the same location cell (that is, an initial strength value associated with a newly deposited marker is added to the aggregated strength value associated with the marker aggregation for the cell in which the new marker has been deposited). The strengths of the marker aggregations are decayed with time but over a long time period. These aggregated "normal" markers serve to indicate the most popular trails, reflecting both the number of users traversing these trails and the time spent on them.

"feature" markers deposited by the unit 57 each time it determines from data in a location report that the device sending the report is in the active zone of a feature. If, as is preferred, the prediction assist data in the location report contains current feature data, then deposition of a feature marker can be restricted to when a user first enters the active zone of the feature, this being achieved by comparing the identity of the current feature as determined by unit 57 with the current feature noted in the location report and only depositing a marker if the two differ. The feature markers are aggregated in feature cells held by the unit 55 and are decayed over a period of an hour to give a picture of the current popularity of the features. Feature cells are simply location cells covering an area corresponding to the active zone of a feature. In a variant, the deposition of a feature marker is only effected when a user is in the active zone of a feature and requests presentation of a related feature item.

The stored markers are put to use for route planning/following, feature popularity review, and prediction purposes. With respect to route planning, when the visit manager 47 of a mobile device 31 requests a route from the route planner 59 of the service system, the latter can ask the application task block 88 of the pheromone trail subsystem 55 to access the stored marker data and propose a possible route based either on the tour markers or the aggregated normal markers. Thus, the route planner, where provided with a subject of interest to the user by the visit manager 47, can be arranged to map this subject to a particular tour sub-type and then retrieve the set of locations of the corresponding tour markers stored by the subsystem 55; these locations are then used to provide a route plan back to the mobile device 31. As described above, no sequence information is stored with the tour markers and whilst this will generally not be an issue, it is possible to provide for the tour markers to carry sequence information in a number of ways, the simplest of which is to associate a sequence number with each tour marker as it is deposited, this number being incremented for each successive marker and being stored along with the marker. An equivalent way of providing sequence information is to incrementally increase/ decrease the strength value assigned to each marker as it is deposited; since the tour marker do not decay, this strength value remains and effectively serves as a sequence number indicating the direction of progression of the tour.

The route planner 59 can be arranged to request the subsystem 55 for the most popular route around the hall 10 as indicated by ridges of higher-strength accumulations of normal markers, or for the least crowded route as indicated by troughs of zero or low-strength accumulations of the normal markers. Of course, the route planner 59 will typically have been requested by a user to provide a route that takes the user to features relating to a particular subject or even to a set of user-selected features; if the route planner decides that there is no relevant pre-planned tour it can use, or if the user has specifically asked for a popular or a least crowded route, then the route planner will use the normal-marker aggregations to aid it in planning a route between the selected features. This can be done by first selecting an order in which to visit the features and then asking the application task block 88 to provide the most popular/least crowded route between each successive pairing of features in the order they are to be visited. Alternatively, the actual order of visiting of the features, as well as the route between each feature, can be determined according to the peaks and troughs of the accumulated normal marker landscape, preferably with account being taken of the total distance to be traveled by the user. In this case, since the application task block 88 has more immediate access to the stored marker accumulations, it may be appropriate for the route planner to hand over the whole task of planning a route to the task block 88.

Rather than determining a route by following ridges or troughs in the accumulated-marker landscape, the route planner can be arranged to determine a route by avoiding ridges or troughs. In relation to route determination, it is to be understood that the term "ridge" includes the limit case of a "peak" and the term "trough" includes the limit case of a "well".

An image of the virtual landscape formed by the location-dependent aggregations of markers mapped to a representation (such as a plan) of the hall 10 can, of course, be passed to the mobile device 31 for presentation to the user.

Another possible usage of the pheromone trail subsystem 55 in respect of providing route information involves the deposition by a first user of user-specific markers that are not aggregated but are arranged to decay in strength over a period of an hour or so. These markers would enable a second user to request the route taken by the first user (for example, by means of a request sent from the visit manager 47 of the second user's mobile device to the route planner 59), the markers deposited by the first user then being accessed to determine the route taken by the first user and their direction of progression as indicated by the current strengths of the markers. This service (suitable for a parent wanting to track a child) can be made private with only the users involved being able to access the relevant marker data and can be provided as a fee-based service.

A similar type of usage involves all members of a group having markers of a type specific to that group, the markers being aggregated on storage. This would enable an overview to be obtained of what the group did during a visit and if the markers concerned did not decay (though typically given a lifespan limited to the day of the visit) and were deposited at fixed time intervals, it would also enable the popularity of different visited features to be discerned. Preferably, the group markers are deposited in addition to normal markers rather than as an alternative to the latter.

Although in the foregoing examples of the use of the pheromone trail system in the embodiment of FIGS. 1 and 2, the route information derived from the stored markers has been passed back to the mobile device for storage in the visit data memory 43 as a route to be followed, it is also possible to have a more dynamic interaction between the mobile device and the stored marker data. Thus, for example, the mobile device 31 can be arranged to query the pheromone trail subsystem 55 continually as to the next location to move to in order to follow a ridge or trough of the marker landscape or to follow a trail laid down by a specific user.

With regard to the use of the deposited marker data for feature popularity review, if a user wishes to ascertain the current relative popularity of the features (or, in user terms, of the exhibits with which the features are associated), the user causes the visit manager 47 to send a request to the pheromone trail subsystem 55. The task block 88 of the subsystem 55 then accesses the feature marker accumulations of the feature cells and uses the strengths of these accumulations to determine the current relative popularity of the features. This popularity data is then returned to the requesting mobile device for presentation to the user. If a longer term view of the popularity of the features is required, then the task block 88 accesses the normal marker aggregations for the feature cells, these aggregations having a longer decay period and, unlike the feature marker accumulations, having a strength that reflects the dwell time at each feature as well as the number of visits.

In respect of use of the deposited marker data for prediction purposes, this involves using the current location or location tail of a user to make predictions as to where the user is likely to go next having regard to what others have done as indicated by the relative strengths of the accumulations of normal markers in location cells adjacent the one in which the user is currently located. If location tail data is available, the strengths of marker accumulations in location cells just visited by the user (and possibly also of the cells on either side of such cells) can be scaled down to reflect the fact that the user is less likely to visit those cells; however, if the geography of the hall or the layout of features of interest to the user is likely to cause the user to turn around, then such scaling down is not effected. Making predictions of the user's future path in this manner is carried out by the application task block 88 of the pheromone trail subsystem. This future path prediction capability can be used by the prediction unit 58 to determine what feature items are likely to be needed in the near future.

It will be appreciated that many other applications are possible for the pheromone trail arrangements discussed above.

With respect to management of the pheromone trail information by the exhibition hall staff, the use of tour markers for defining tours has already been mentioned. However, other management techniques are also possible. For example, as an alternative to using tour markers, or in order to modify trails such as those defined by ridges or troughs of aggregated normal markers, a special marker type that has a very high initial strength (for example, 10,100 or a 1000 times stronger than a normal marker) can be defined and associated with the role of a tour guide—this guide then traverses the hall on a desired path depositing the high-strength markers along the way. These high-strength markers are aggregated with normal markers and effectively serve to swamp existing trail information based on the latter whereby to define new trails (in fact, the actual strength of the high-strength markers need not be pre-selected but can set adaptively depending on the strength of marker aggregations encountered—all that is required is that the strength of the high-strength markers is sufficient to swamp the strength values of any aggregations of normal markers already deposited in respect of the locations concerned). A reverse effect can also be provided by defining a 'negative' strength marker type (a 'wipe-out' type) to wipe out, or at least reduce, aggregated strength values of normal markers along particular paths (this assumes that the normal markers have 'positive' strength values—more generally, the normal markers and the wipe-out markers simply need to be treated as having strength values of opposite signs). Wipe-out markers can have a specific negative strength value or can be arranged to exactly cancel out the aggregated normal marker strength in the location cells concerned.

Instead of seeking to modify existing trail information by having a tour guide deposit additional markers, the service system 35 can be arranged to enable an operator to modify the stored marker information via an interface 200 (FIG. 2) to the pheromone trail subsystem 55 without the need to move around the hall. The interface 200 is arranged to enable the operator to view a map of the location cells showing the aggregated marker strength of each cell for one or more marker types or combinations of types. The interface 200 is further arranged to enable the operator to modify the displayed aggregated marker-strength information or its significance, using any appropriate input device, in one or more of the following ways:

Adjustment of Individual Cell Strengths

Adjustment of the strength values of individual location cells can be effected by depositing a marker of type "operator" in the cell with a specified strength, the deposited operator marker then having its strength value aggregated with the strength values of the normal markers associated with the same location cell. The operator marker can have a negative strength value which may, for example, be such as to cancel out the existing strength value in the cell concerned (in other words, the operator marker can serve as a wipe-out marker).

Writing/Erasing Trails

A trail of new markers (for example, a trail of high-strength or negative-strength markers such as described above) can be deposited by drawing the trail over the displayed map, the deposited markers being aggregated with the existing normal markers.

Shifting an Existing Trail

Figure 7:
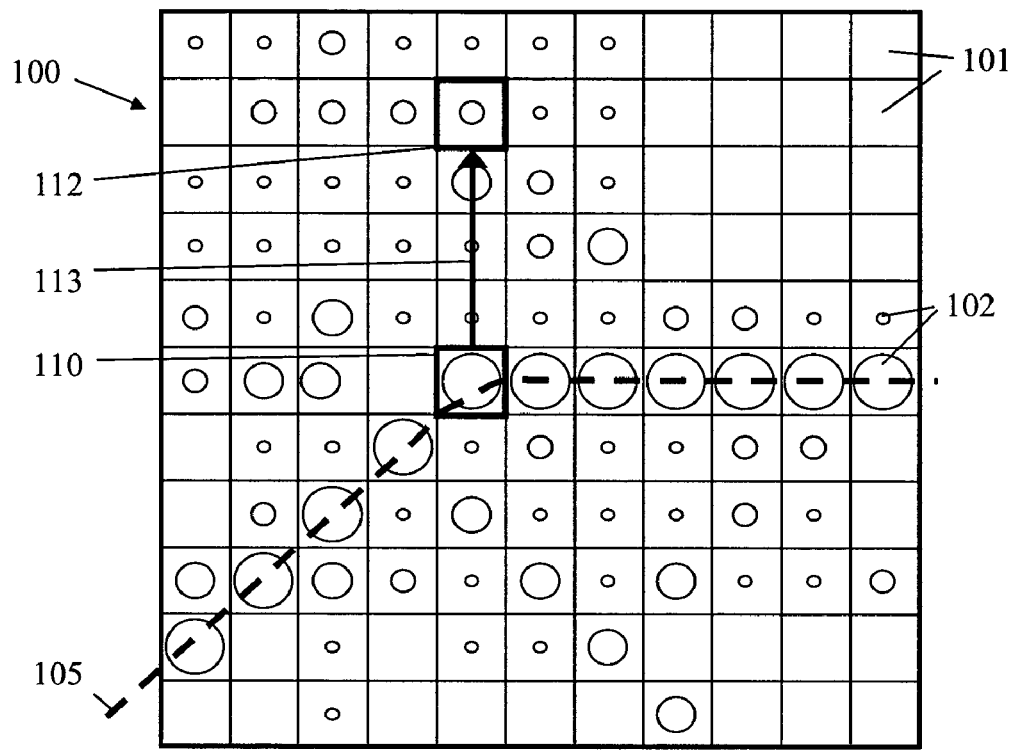
FIG. 7 is a diagram of a location-cell grid showing both the strength values of marker aggregations associated with the cells, and a path determined on the basis of following a ridge of high-strength aggregations.
Figure 8:
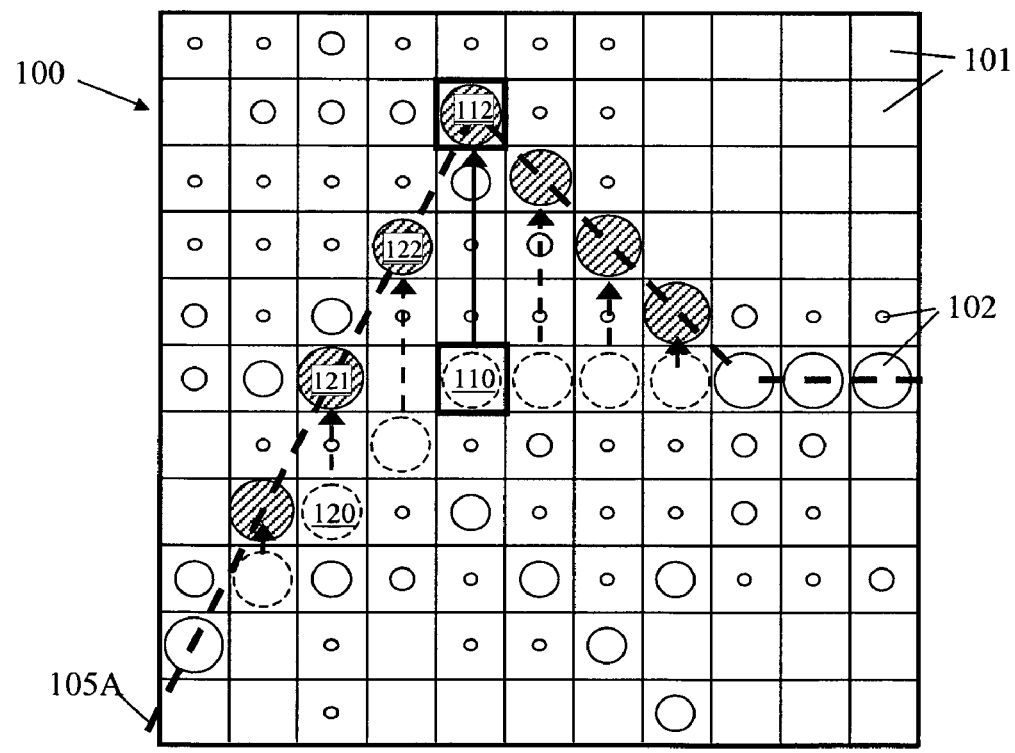
FIG. 8 is a diagram illustrating for the FIG. 7 location-cell grid, a process by which an operator can shift the path by transferring aggregated strength values between cells.

Shifting an existing trail can be effected by transferring strength values between cells. One way of doing this is explained below with reference to FIGS. 7 and 8 that show an example map 100 comprising a ten-by-ten grid of location cells 101 with the aggregated strength value of each cell for normal markers deposited in that cell being indicated by the size of a circle 102 displayed inside the cell. Dashed line 105 in FIG. 7 depicts an existing trail that follows a ridge of cells with high strength values. To shift the trail 105 a first location cell 110, located on trail 105, is selected and the aggregated strength value of that cell is transferred to a second location cell 112. Conveniently, this can be implemented as a "drag and drop" operation (represented by arrow 113) with the first cell 110 being dragged and dropped onto the second cell 112, this operation being arranged to cause the strength value of the dragged first cell 110 to be transferred to the second cell 112. In addition, cells that lie on the original trail 105 and are within a defined distance of the first cell 112 also have their strengths transferred in the same direction as the strength value of the first cell, but by a lesser distance, for addition to corresponding existing cells; preferably, the transfer distance is reduced in proportion to the distance of the cell from the original location of the dragged cell. These transfers are depicted in FIG. 8 by the dashed arrows with the original aggregations being depicted by dashed circles and the new aggregations by hatched circles (thus, for example, the aggregation previously in cell 120 is moved to cell 121, the transfer distance being half that from cell 110 to cell 112). When transferring the strength values of cells that are near to the initially-selected cell 110 ("nearby" cells), two approaches are possible:

in a first approach, the aggregated strength value of each "nearby" cell is kept undivided and transferred to the cell indicated by adding the transfer distance to the centre point of the original "nearby" cell;

in a second approach, where the individual markers are stored, each marker associated with a "nearby" cell has its location information modified by the transfer distance after which the aggregated strength values for the affected location cells are re-determined.

The first approach is used in FIG. 8 and, as can be seen, may give rise to gaps between cells (such as between cells 121 and 122) that hold the high-strength aggregations that define the shifted trail (referenced 105A). The ridge-following algorithm used to define trails on the basis of the aggregated marker strengths will typically be able to handle such gaps (for example, by extrapolation of an existing partial trail across such gaps); alternatively, fill-in aggregation values can be automatically added to the gap cells as part of the trail shifting process to maintain the continuity of cells with high aggregated-strength values. It may be noted that if the second approach discussed above is used, the aggregated strength value of a "nearby" cell may be spread across two or more cells thereby producing a dip in strength values along the trail—again, the ridge following algorithm will typically be able to handle such dips, and/or the strength values for the cells concerned can be automatically increased to compensate.

Whilst the foregoing description of trail shifting has been with respect to aggregated strength values, trail shifting can also be applied where a trail is made up of single markers—this may be the case, for example, for a trail defined by tour markers. Trail shifting can be applied to all markers/marker aggregations that lie on the trail concerned or can be applied only to markers/marker aggregations of a specific type or associated with a specific user. In the limit, a trail may be modifiable by changing the association between only a single marker and a location or location cell.

Modifying the Mapping of Location Cells to the Real World

Figure 9:
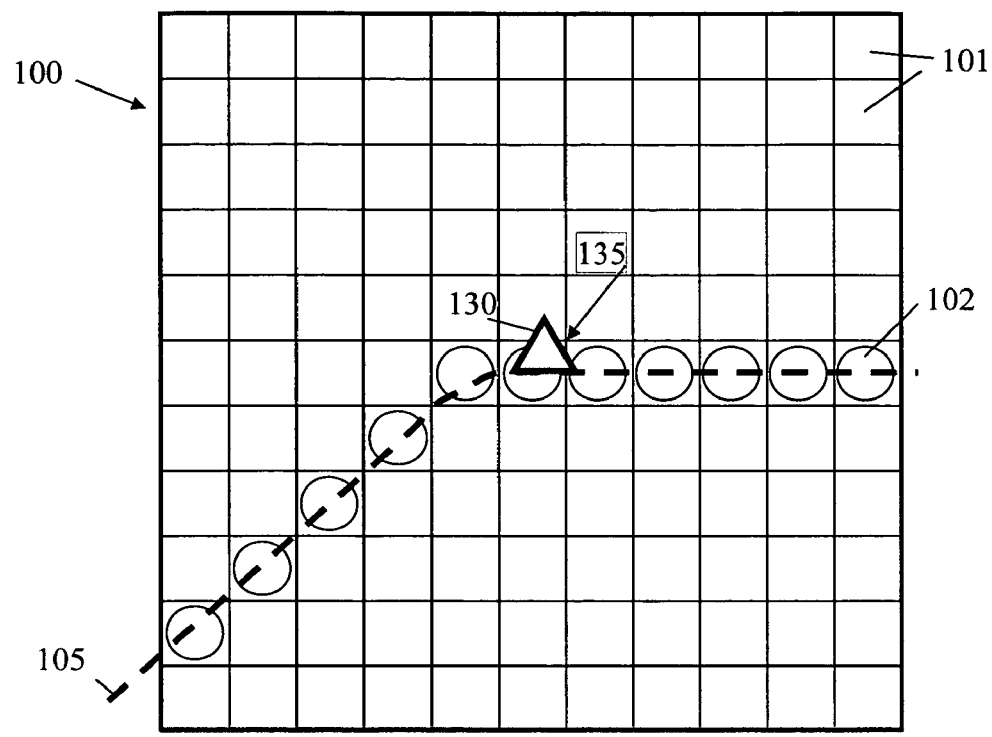
FIG. 9 is a diagram similar to that of FIG. 7 showing the proposed addition of a new exhibit.

The significance of the stored marker information can be modified by modifying the mapping between location cells and the real world. This approach is useful, for example, to take account of the addition/removal of a large exhibit (such as a sculpture) in the centre of a room. By way of illustration, FIG. 9 shows superimposed on the map 100 (the axes of which are in terms of real-world coordinates) an exhibit 130 to be added in the position indicated; it should be noted that, for reasons of clarity, FIG. 9 only shows the marker aggregations delineating the trail 105. To allow for the new exhibit 130 the mapping of the affected cells to the real world is altered such that the existing location cells do not impinge on the new exhibit; the markers/marker aggregations associated with existing location cells remain associated with those cells with the result that existing trails defined by the markers/aggregations of markers now pass around the exhibit. Put another way, an existing grid of location cells is effectively distorted as required and although the existing trail remains unchanged in terms of the location cells it passes through, the mapping of these cells to real world areas in the hall 10 is modified. Additionally, one or more new location cells can be added (for example to correspond to the area now occupied by the new exhibit and no longer covered by any other location cell) or one or more location cells can be removed.

Figure 10:
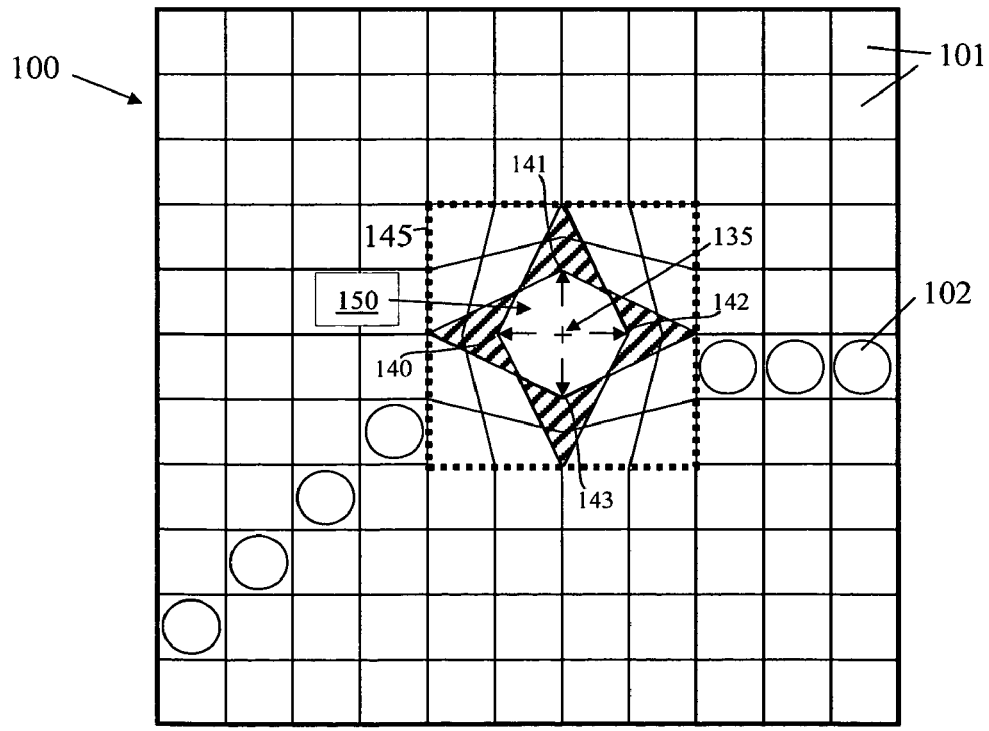
FIG. 10 is a diagram showing a first stage of a process for modifying the location-cell grid of FIG. 9 to accommodate the new exhibit.
Figure 11:
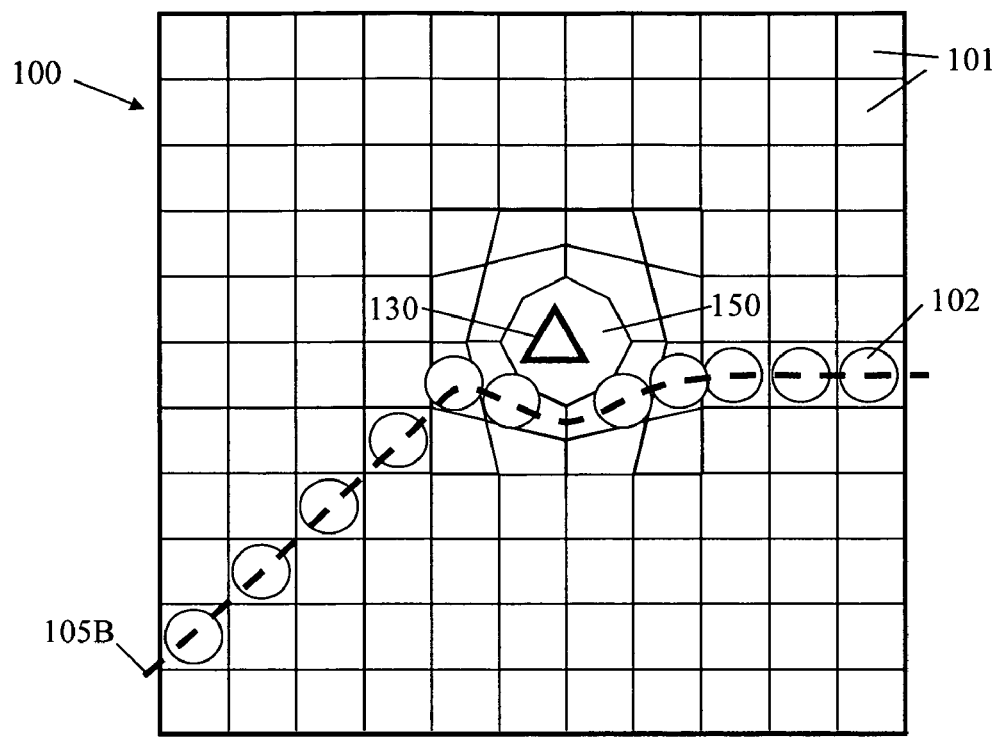
FIG. 11 is a diagram showing a second stage of the process for modifying the location-cell grid of FIG. 9 to accommodate the new exhibit.
Figure 12:
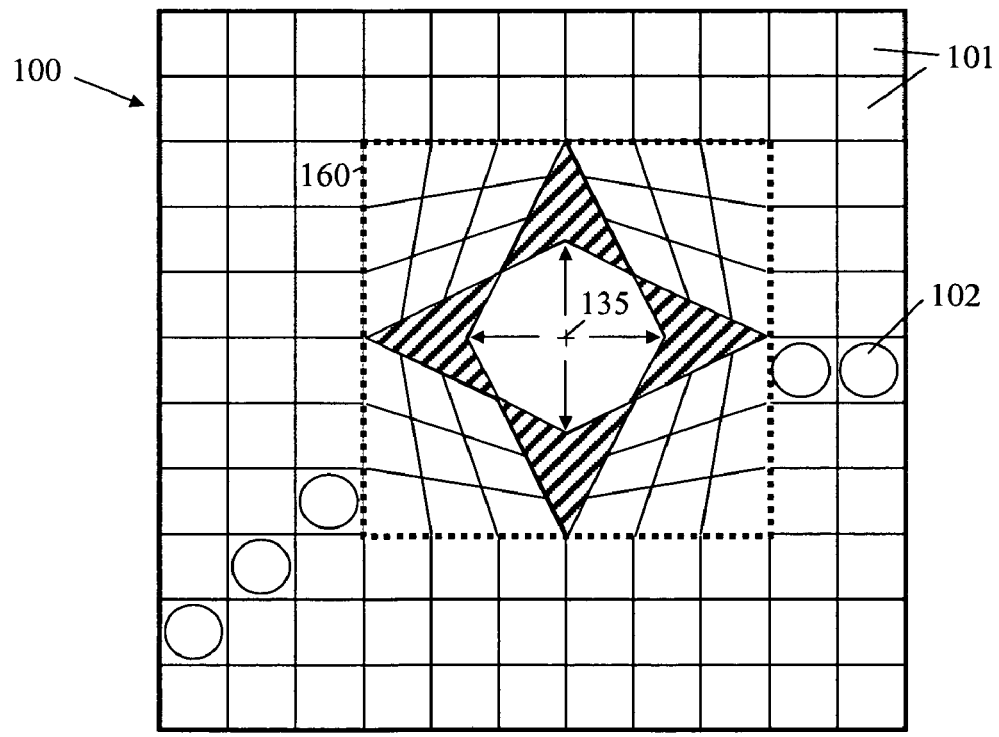
FIG. 12 is a diagram similar to that of FIG. 10 but depicting the first stage of the modification process for a larger affected area.

FIGS. 10 to 12 illustrate one way of modifying the grid of location cells depicted in FIG. 9 to take account of the addition of exhibit 130. More particularly, the grid intersection 135 closest to the center of the exhibit 130 is first identified and then used to establish four points 140, 141, 142 and 143 spaced from the intersection 135 at a distance of one cell width/height along the positive and negative coordinate directions of the grid—the spacing of these points from the intersection 135 is selected to define a zone 150 (constructed as described below) that will fully encompass the exhibit 130 whilst being as small as possible having regard to the permitted size increments of the spacing (in this example, set to half the width/height of a cell); determination of the correct size for the spacing of the points 140-143 from the intersection 135 may require trial and error, starting from the smallest permitted spacing. The chosen spacing is also used to set the size of a bounding box 145 outside of which the location-cell grid is unaffected. The bounding box is centered on the intersection 135 and preferably its sides are set at four times the size of the spacing between each point 140-143 and the intersection 135. Given the points 140-143 and the bounding box 145, the cell-defining grid lines are shifted within the box as illustrated in FIG. 10, distorting the original cells and creating five new zones, namely the central zone 150 mentioned above and four other zones (shown hatched). Next, the four new hatched zones are divided up and added to the existing location cells to give the latter their shapes as depicted in FIG. 11; by doing this, each of the original cells within the box 145 has the same direct neighbours (cells which share a common side) as before the grid was modified. As illustrated in FIG. 11 and as already noted above, the aggregated strength values remain associated with the modified cells; this, coupled with the fact that the direct neighbours of a cell are unchanged, helps to maintain trail continuity despite modification of the grid. In particular, the continuity of trail 105 remains though the trail now has a different form 105B which takes it around the zone 150. Finally, zone 150, which fully encompasses the new exhibit 130, is treated as a new location cell.

FIG. 12 is similar to FIG. 10 but illustrates the setting of the spacing between the points 140-143 and the intersection 135 to a value equal to 1.5 times the unmodified cell height/width with the bounding box 145 having its sides equal to 6 times the unmodified cell height/width. The modification of the grid lines within the bounding box 145 is also depicted.

The location cell modification process described above with reference to FIGS. 9 to 12 is preferably carried out automatically under program control once the operator has determined where the new exhibit is to be place.

Whilst in the examples of FIGS. 9 to 12 the mapping between location cells and the real world has been modified to allow for a new exhibit, there are many reasons why one might wish to modify the mapping including to take account of the removal of an exhibit or of alterations to the structure of the hall, to manage flows of people in the hall, etc. Furthermore, there are many possible ways in which the mapping between location cells and the real world can be modified, including by direct operator designation. Of course, with a variable mapping between real-world locations and the location cells, it is no longer possible to directly use the location information associated with a marker as specifying the related location cell and some form of mapping process is required to translate a marker location to the related location cell. The most straight forward implementation of this mapping process is to use a look-up table mapping all possible locations (limited by the desired location resolution) to the corresponding location cells; in this case, as the process depicted in the example of FIGS. 9 to 11 is completed, the mapping data held in the look-up table would be updated. Other mapping-process implementations are possible.

It should also be noted that where individual marker records are stored and aggregated strength values are only determined when required; in this case, if the mapping between real-world locations and location cells is modified, then determination of the aggregated strength values using the modified mapping with the original marker location data stored in the marker records could result in dispersion of strength values previously associated with a single cell. This, in turn, could result in the destruction of a trail segment. To avoid this eventuality, each marker record preferably includes an indication of the corresponding location cell at the time of marker deposition (that is, according to the then current mapping and the location data associated with the marker); this location-cell indication is then subsequently used for determining the cell with which the marker strength value is to be aggregated.

If the granularity of the location cells matches the resolution of location determination, the concept of location cells becomes unnecessary as each real-world location maps to a corresponding respective virtual world location. Modifying the significance of the stored marker data by modifying the mapping between the real and virtual worlds can then be expressed simply in terms of modifying the mapping between real-world locations and virtual-world locations; as already noted, modifying the mapping is preferably done without modifying the particular virtual-world locations with which existing markers were associated at the time they were deposited. Trail information is initially determined in terms of virtual-world locations and then mapped to locations in the real world using the current form of the mapping.

Other useful modification operations will be apparent to persons skilled in the art.

The above described methods and arrangements are not limited to use in exhibition halls or similar public or private buildings; the methods and arrangements disclosed can be applied not only to internal spaces but also to external spaces or combinations of the two. As already noted, the distribution of functionality between mobile devices and the service system is not limited to the distributions described above since the availability of communication resources makes it possible to place functionality where most suitable from technical and commercial considerations. Furthermore, in the foregoing reference to a mobile device is not to be construed as requiring functionality housed in a single unit and the functionality associated with a mobile device can be provided by a local aggregation of units.

The invention claimed is:

1. A method of providing information about a real-world space, comprising:
   (a) as users move through said space, virtual markers are deposited and stored as marker data to indicate associated locations visited by the users in the space; and
   (b) the stored marker data is used to provide trail information for guiding users in The space; wherein an operator, using an interface unit and without the need to move around said space, modifies the stored marker data or its significance whereby to modify the trail information derived therefrom;
   wherein the virtual markers deposited in respect of said users are aggregated, in dependence on their associated locations, either when being stored or subsequently and the trail information provided in step (b) is based upon the aggregated markers; the operator modifying the stored marker data by depositing additional markers in respect of particular locations or areas in said space; the additional markers, when aggregated with the markers deposited in respect of said users for the same locations or areas, serving to modify said trail information; and
   wherein a plurality of location cells are defined that correspond to respective areas of said space, the markers having associated strength values and each marker being stored and aggregated by having its strength value added to an existing aggregated strength value, if any, associated with in the corresponding location cell.

2. A method according to claim 1, wherein the markers deposited in respect of said users are deposited with first strength values and the said additional markers are deposited with second strength values, said second strength values being greater than said first strength values.

3. A method according to claim 2, wherein said additional markers are deposited in respect of a succession of adjacent locations or areas in said space, said second strength values being sufficient to swamp the strength values of any aggregations of markers already deposited in respect of the locations or areas concerned whereby the additional markers serve to define a path in said space.

4. A method according to claim 1, wherein the markers deposited in respect of said users are deposited with first strength values and the said additional markers are deposited with second strength values, said second strength values being of opposite sign to said first strength values.

5. A method according to claim 1, wherein in step (b) said trail information is derived by determining a path that follows or avoids either ridges or troughs in a virtual landscape defined by the relative strengths of the location-dependent aggregations of said markers.

6. A method according to claim 1, wherein the markers each have an initial strength value and the strength values associated with the deposited markers, either taken individually before aggregation or in the location-dependent aggregations, are caused to decay with time; the trail information being derived in step (b) on the basis of the then current strength values of the aggregated markers.

7. A method according to claim 1, wherein the stored marker data comprises, for each individual marker, data indicative of its said associated location; the operator modifying the stored marker data to modify for at least one marker its indicated said associated location.

8. A method according to claim 1, wherein a plurality of location cells are defined that correspond to respective areas of said space, the stored marker data comprising data associating each marker with a said location cell; the operator modifying the stored marker data to change, for at least one marker, the location cell with which it is associated.

9. A method according to claim 1, wherein a plurality of location cells are defined that correspond to respective areas of said space, said markers having associated strength values and each cell having an aggregated strength value that is determined by aggregating, either on marker storage or subsequently, the individual strength values of the markers associated with locations covered by the said area to which the cell corresponds; step (b) being carried out on the basis of said aggregated strength values and the operator modifying the stored marker data by a process comprising transferring the aggregated strength value of a first said location cell to a second said location cell, this transfer including the aggregation of the transferred strength value of the first cell with the aggregated strength value of the second cell.

10. A method according to claim 9, wherein said process comprises:
   the operator selecting said first and second location cells with the first cell lying on a path that follows features in a virtual landscape defined by the relative strengths of the aggregated strength values of said location cells;
   transferring the aggregated strength value of the first location cell to the second location cell; and
   transferring the aggregated strength values of third location cells that lie on said path near the first location cell to fourth location cells that lie in the same direction as the second cell from the first, the transfer distance between each third cell and a corresponding one of said fourth cells decreasing with decreasing proximity of the third cell concerned to said first cell.

11. A method according to claim 9, wherein in step (b) said trail information is derived by determining a path that follows or avoids either ridges or troughs in a virtual landscape defined by the relative strengths of the aggregated strength values of said location cells.

12. A method according to claim 9, wherein the strength values associated with the deposited markers, either taken individually before aggregation or in the location-cell aggregated strength values, are caused to decay with time; the trail information being derived in step (b) on the basis of the then current aggregated strength values.

13. A method according to claim 1, wherein locations in said space are related to locations in a virtual world by a specified mapping, the stored marker data associating the markers with particular locations in the virtual world, and the operator modifying the significance of the stored marker data by modifying said mapping without modifying the particular virtual-world locations with which the markers are associated; the trail information provided in step (b) being determined in terms of virtual-world locations and mapped to locations in said space using the current form of the mapping.

14. A method according to claim 1, wherein areas of said space correspond, according to a specified mapping, to respective ones of a plurality of virtual location cells, the stored marker data associating the markers with the location cells, and the operator modifying the significance of the stored marker data by modifying said mapping; the trail information provided in step (b) being determined in terms of location cells and mapped to said areas using the current form of the mapping.

15. A method according to claim 14, wherein said mapping is modified by the insertion of one or more new location cells.

16. A method according to claim 14, wherein each marker has a strength value when deposited, each marker being associated with the location cell that corresponds, through said mapping in its form at the time of marker deposition, with the area covering the location associated with the marker, this association being by the aggregation of the marker's strength value with an existing aggregated strength value of that cell; and step (b) being carried out on the basis of said aggregated strength values.

17. A method according to claim 16, wherein in step (b) said trail information is derived by determining a path that follows or avoids either ridges or troughs in a virtual landscape defined by the relative strengths of the aggregated strength values of said location cells.

18. A method according to claim 16, wherein the strength values associated with the deposited markers, either taken individually before aggregation or in the location-cell aggregated strength values, are caused to decay with time; the trail information being derived in step (b) on the basis of the then current aggregated strength values.

19. A method according to claim 14, wherein each marker has a strength value when deposited, each marker being associated with the location cell that corresponds, through said mapping in its form at the time of marker deposition, with the area covering the location associated with the marker, the stored marker data comprising individual data for each marker with this individual data including an indication of the associated location cell; and step (b) being carried out on the basis of aggregated strength values of said cells where the aggregated strength value of a cell is determined by aggregating the strength values of the markers associated with the cell.

20. A method according to claim 19, wherein in step (b) said trail information is derived by determining a path that follows or avoids either ridges or troughs in a virtual landscape defined by the relative strengths of the aggregated strength values of said location cells.

21. A method according to claim 19, wherein the strength values associated with the deposited markers, either taken individually before aggregation or in the location-cell aggregated strength values, are caused to decay with time; the trail information being derived in step (b) on the basis of the then current aggregated strength values.

22. Apparatus for providing information about a real-world space, comprising:
a marker-data arrangement for receiving virtual markers deposited in respect of users in said space to indicate locations visited by said users, and for storing marker data corresponding to, or based on, the received virtual markers;
a trail-information arrangement for using the stored marker data to provide trail information for guiding users in the space;
an interface unit for enabling an operator, without the need to move around said space, to modify the stored marker data or its significance whereby to modify the trail information derived therefrom;
wherein one of the marker-data arrangement and the trail-information arrangement is arranged to aggregate said virtual markers in dependence on their associated locations;
wherein the trail-information arrangement is arranged to provide said trail information based upon the aggregated markers; and the interface unit is arranged to enable the operator to modify the stored marker data by depositing additional markers in respect of particular locations or areas in said space; the additional markers, when aggregated with the markers deposited in respect of said users for the same locations or areas, serving to modify said trail information; and wherein the interface unit is arranged to enable the operator to deposit markers of a strength value greater than that of markers deposited in respect of said users.

23. Apparatus according to claim 22, wherein the interface unit is arranged to enable the operator to deposit markers having a strength value of opposite sign to that of markers deposited in respect of said users.

24. Apparatus according to claim 22, wherein the interface unit is arranged to enable the operator to modify the stored marker data such as to modify, for each individual marker, data indicative of its said associated location.

25. Apparatus according to claim 22, wherein:
the apparatus is arranged to model said space as a plurality of location cells that correspond to respective areas of said space;
the marker-data arrangement is arranged to store said marker data as respective aggregated strength values for each location cell, the marker-data arrangement being arranged to determine said aggregated strength value of a said location cell as an aggregate of strength values of markers deposited for locations covered by the said area to which the cell corresponds;
the trail-information arrangement is arranged to provide said trail information on the basis of said aggregated strength values; and
the interface unit is arranged to enable the operator to modify the stored marker data by transferring the aggregated strength value of a first said location cell to a second said location cell, the interface unit being further arranged to aggregate the transferred strength value of the first cell with the aggregated strength value of the second cell.

26. Apparatus according to claim 25, wherein the interface unit is further arranged:
to recognise when said first cells lies on a path that follows features in a virtual landscape defined by the relative strengths of the aggregated strength values of said location cells; and
to transfer, following transfer of the aggregated strength value of the first location cell to the second location cell, the aggregated strength values of third location cells that lie on said path near the first location cell to fourth location cells that lie in the same direction as the second cell from the first, the transfer distance between each third cell and a corresponding one of said fourth cells decreasing with decreasing proximity of the third cell concerned to said first cell.

27. Apparatus according to claim 22, wherein:
the apparatus is arranged to store a mapping relating locations in said space to locations in a virtual world, the marker data being arranged to associate the received virtual markers with particular locations in the virtual world;
the interface unit is arranged to enable the operator to modify the significance of the stored marker data by modifying said mapping without modifying the particular virtual-world locations with which the virtual markers are associated; and
the trail-information arrangement is arranged to determine said trail information in terms of virtual-world locations and to map these locations to locations in said space using the current form of the mapping.

28. Apparatus according to claim 22, wherein:
the apparatus is arranged to store a mapping relating areas in said space to respective ones of a plurality of virtual location cells, the marker data being arranged to associate the received virtual markers with particular virtual location cells in the virtual world;

the interface unit is arranged to enable the operator to modify the significance of the stored marker data by modifying said mapping; and the trail-information arrangement is arranged to determine said trail information in terms of virtual location cells and to map these location cells to areas in said space using the current form of the mapping.

29. Apparatus according to claim 28, wherein the interface unit is arranged to enable the operator to modify said mapping by inserting one or more new location cells.

* * * * *